United States Patent
Hammet (10) Patent No.: US 7,588,268 B2
(45) Date of Patent: Sep. 15, 2009

(54) MULTI-PAGE VIEWING BINDER

(76) Inventor: Errol Scott Hammet, 1611 Madrid Ave., Port Royal, SC (US) 29935

( * ) Notice: Subject to any disclaimer, the term of this patent is extended or adjusted under 35 U.S.C. 154(b) by 370 days.

(21) Appl. No.: 11/127,454

(22) Filed: May 12, 2005

(65) Prior Publication Data

US 2005/0252360 A1   Nov. 17, 2005

Related U.S. Application Data (60) Provisional application No. 60/569,928, filed on May 12, 2004.

(51) Int. Cl.
*B42D 9/00* (2006.01)
*B42D 1/00* (2006.01)

(52) U.S. Cl. .......................... 281/42; 281/38

(58) Field of Classification Search ............... 402/57, 402/70, 73, 80 R, 80 P, 500; 281/15.1, 21.1, 281/27.1–27.3, 12, 13, 33, 22, 38, 42; 40/617, 40/658, 661.06; 24/22, 67.9, 67.11
See application file for complete search history.

(56) References Cited

U.S. PATENT DOCUMENTS

| | | | | |
|---|---|---|---|---|
| 286,736 | A * | 10/1883 | Shepard | 40/536 |
| 897,600 | A * | 9/1908 | Davis | 283/36 |
| 1,487,433 | A * | 3/1924 | Beckert | 224/241 |
| 2,228,355 | A * | 1/1941 | Key | 402/26 |
| 2,310,722 | A * | 2/1943 | Weinger | 281/22 |
| 2,963,809 | A * | 12/1960 | Parker | 40/775 |
| 3,136,082 | A * | 6/1964 | Sloves | 40/530 |
| 3,425,389 | A * | 2/1969 | Arcieri et al. | 116/236 |
| 3,877,729 | A * | 4/1975 | Friedman | 283/42 |
| 4,175,340 | A * | 11/1979 | Deutch | 281/16 |
| 4,863,194 | A * | 9/1989 | Friedman | 283/38 |
| 4,965,948 | A * | 10/1990 | Ruebens | 40/537 |
| 5,106,097 | A * | 4/1992 | Levine | 273/237 |
| 5,628,511 | A * | 5/1997 | Jacoby | 273/148 R |
| 5,713,684 | A * | 2/1998 | Turecamo | 402/79 |
| 5,992,887 | A * | 11/1999 | Maruchi | 281/42 |
| 6,169,876 | B1 * | 1/2001 | Larson et al. | 434/309 |
| 6,474,010 | B1 * | 11/2002 | Hwang | 40/776 |
| 6,601,327 | B2 * | 8/2003 | Ruebens | 40/537 |
| 7,290,365 | B1 * | 11/2007 | Plutsky | 40/765 |
| 2006/0150457 | A1 * | 7/2006 | O'Boyle | 40/658 |

FOREIGN PATENT DOCUMENTS

EP        0990976 A2 *  3/1999

* cited by examiner

*Primary Examiner*—Dana Ross
*Assistant Examiner*—Pradeep C Battula (57) ABSTRACT

An improved music holder (12) enabling the user to view more than two sheets of music (or other printed material) at a given time. A front cover (14), a back cover (16), a plurality of display boards-A (24) and a plurality of display boards-B (28) are bound together with a wire spiral (18). Light-weight chain (20) (or similar non-stretching material) attaches to chain anchors (32) to support the front cover (14) in an open position. Paper clamp tabs (26) affix paper clamps (22) to the top edge of each display board (24)(28). Music sheets are inserted by sliding the top or bottom edge of each sheet between the display board (24)(28) and the paper clamp (22). Display boards (24)(28) may be turned in either direction to access another set of music sheets. Hanging brackets (30) secure the music holder (12) to a standard music stand (or similar device).

14 Claims, 5 Drawing Sheets

MULTI-PAGE VIEWING BINDER

CROSS REFERENCE TO RELATED APPLICATIONS

This applications claims the benefit of provisional patent application Ser. No. 60/569,928, filed 2004 May 12 by the present inventor.

FEDERALLY SPONSORED RESEARCH

Not applicable

SEQUENCE LISTING OR PROGRAM

Not applicable

BACKGROUND OF THE INVENTION

1. Field of Invention

This invention generally relates to a device for holding sheets of music, and more specifically it relates to an improved binder for holding a plurality of single sheets of music on each of a plurality of display boards and may be deployed upon a music stand, easel, or similar device.

2. Discussion of Prior Art

Previously, music binders allowed musicians to view one or two sheets of music simultaneously when the binders were in the open position. Having only one or two pages displayed at a given time forced musicians to turn pages back and forth very quickly in order to follow the musical score. This was a cumbersome and distracting task for most musicians. When playing instruments that required two hands, the task of rapid page turning could become prohibitively challenging.

Background research discovery provides some prior patent-art in which attempts have been made to assist the musicians by the implementation of various page-turning mechanisms. However impractical, this prior patent-art may be regarded as at least remotely germane to this disclosure.

In U.S. Pat. No. 6,107,558 (filed: Feb. 17, 1999) is shown a semi-automatic page-changer apparatus that has an on/off switch, driving a motor turning a helical conveyor-spindle feeding device. Loose-leaf pages each having a hanger-hole arranged centrally into its header-margin are thereby hung together in the upper portion of this machine. Ultimately, the helical causes the pages to fall to a lower holding stack where they can be observed by the reader.

This relatively complicated device has limited use in that a maximum of two pages can be viewed at a given time, there is no mechanism for quickly and conveniently viewing previously processed pages, and its motor requires a power source.

In U.S. Pat. No. 3,096,102 (filed Oct. 11, 1961) is shown an easel binder for pages reading on lines parallel with the binding. The main feature of this device is a hinged structure that folds outward to allow one side of the binder to be propped up for more convenient reading purposes. This device is basically a standard 3-ring binder having incorporated therein a structure that can be raised to support the pages in an inclined position. As in a standard 3-ring binder, pages having holes that align with the rings in the binder may be inserted.

This device has limited use in that only two pages can be viewed at a given time. This device makes no provision for its attachment to a music stand or similar structure.

In U.S. Pat. No. 2,514,068 (filed: Jan. 17, 1947) is shown a music holder designed solely to affix to a band instrument. This device has a series of transparent envelopes in which the music is held. The envelopes are bound together by rings located along the top edge of the device. Each envelope exposes a sheet of music on each side of the envelope. Only one sheet of music can be viewed at a given time. When the sheet of music on the exposed side of the first envelope has been played, the instrument player will swing that envelope over the top of the ring binding. By this action the second envelop is revealed.

This device has limited use in that it must be attached to a band instrument, only one sheet of music can be viewed at a given time, and the transparent envelopes have the potential of creating glare that will prevent the user from seeing the music contained therein. This device makes no provision for its attachment to a music stand or similar structure.

In U.S. Pat. No. 1,416,903 (filed Apr. 3, 1920) a music binder for loose pages. This device's primary function is to allow ready reference by constantly visable numerals to disclose the location in the binder of any musical composition therein. Two pages of sheet music can be viewed at a given time. Flexible leaves with dimensions slightly larger than the sheet music are bound in the holder. Each leaf has a tag attached to its side edge. There is a numeral printed on each tag. The sheet music has removable clips that attach to the page. The clips are slidably arranged on a cable that is affixed to and lies vertically in the center of the binder.

This device is designed to allow the quick location of any specific musical composition therein. This device has limited use in that only two pages can be viewed at a given time.

In U.S. Pat. No. 991,753 (filed Aug. 22, 1910) is shown a holder for loose pages. The page holder is held in vertical position by its own unique apparatus which allows its mounting to a musical instrument. A type of stubs are affixed to the pages along the top edge of the pages. A rod runs through the stubs to create a hinge that bounds the pages together. Only one page can be viewed at a given time. When the viewing of a second page is desired, the user will flip the first page over the top of the hinged binding. By this action the second page is revealed.

This device has limited use in that only one page can be viewed at a given time, the loose leaf pages must have stub devices affixed to them, and the holder's unique apparatus for mounting has limited application. This device makes no provision for its attachment to a music stand or similar structure.

In U.S. Pat. No. 614,372 (filed Feb. 28, 1898) is shown a mechanical leaf-turning device in which a longitudinally-reciprocable carriage having a shaft provided with fingers by which to hold the leaves, and a spring by which to give tension to said shaft are set in motion to cause a top leaf to fall to a lower position. A hand-crank is shown in FIG. 10 to illustrate a method of powering this apparatus. However, the carriage may be reciprocated in various ways, and, where desired, electricity may be employed wherein armatures at the opposite ends of the carriage are attracted by magnets, which may be alternately energized so as to allow the device to function without requiring the operator to stop work. Music may be printed directly upon the leaves, or pages may be attached to the leaves using some outside mechanism not included as part of this device.

This relatively complicated mechanical device contains no mechanism for attaching music sheets to the leaves, this device's design prohibits the operator from viewing previously processed pages, and its operation requires the turning of a hand-crank or an alternate power source, such as an electric motor. The claims make no reference to attaching music sheets or pages of any kind to the leaves. The claims make no claim to a device for attaching pages to the leaves. The specification makes no reference or implied intent to the attaching of more than one music sheet to a given leaf.

Therefore, in consideration of the preceding patent review, there is determined a need for an improved form of device for holding sheets of music.

3. Objects and Advantages

Accordingly, several objects and advantages of this invention are an improved form of device that will allow the user to view more than two sheets of music simultaneously in an orchestral or stage setting and has a means for attaching and removing the sheets of music efficiently on a plurality of display boards arranged and supported for generally vertical turning. Also, this invention provides a means by which the music holder attaches to a standard music stand (or similar device) to create a secure, removable coupling of the music holder with the stand. Also, this invention provides the user a quick and convenient means to access sets of sheets of music on the display boards exposed previously. Further objects and advantages of my invention will become apparent from a consideration of the drawings and ensuing description.

SUMMARY OF THE INVENTION

According to the present invention, there is provided a music holder that allows the user to view more than two sheets of music (or other printed material, perhaps an orator's speech-pages) at a given time. Typically, six sheets having the standard dimensions of 8½ inches×11 inches may be viewed simultaneously; however, the number of standard sheets that may be viewed simultaneously is determined by the dimensions of the music holder.

Typically, the music-score/lyrics pages are initially photocopied from an original music-book or other source, upon one side of a page only. These photocopied sheets of music are attached to a plurality of display boards. The display boards are permanently attached in the music holder in a way that allows the user to easily turn the display boards vertically in either direction, upward and downward, to quickly access another set of sheets of music.

Another object of this invention disclosure is to set forth a means by which sheets of music are affixed to each of the display boards by sliding the top or bottom edge of each sheet between the display board and a paper-clamping device that is permanently affixed to the display board. This has the effect of pinching and holding the sheets of music to the display board, yet the sheets can be easily removed and replaced without damaging the sheets, themselves, or the display board.

Another object of this invention disclosure is to set forth a means by which the music holder attaches to a standard music stand (or similar device) to create a secure, removable coupling of the music holder with the stand, for example by provision of two heavy-gauge metal brackets permanently mounted to the back cover of the music holder and are preferably formed to fit intimately onto the top edge of most standard music stands. The music holder is designed to simply hang in place on the stand.

DRAWINGS

Figures

DRAWINGS

Reference Numerals 12 music holder assembly
14 front cover
16 back cover
18 wire spiral
20 chain
22 paper clamp
23 paper clamp tab slot
24 display board-A
26 display board tabs
28 display board-B
30 hanging bracket
32 chain anchor
33 display board-A holes
34 front cover holes
35 back cover holes
36 opening in back cover through which a hanging bracket may protrude

DETAILED DESCRIPTION OF THE PREFERRED EMBODIMENT

A preferred embodiment of the present invention is illustrated in FIGS. 1 through 4B. FIGS. 5A through 8 illustrate most of the preferred individual parts of the invention to add clarity to a description of this invention, and of the manner and process of making it, in such full, clear, concise and exact terms as to enable any person skilled in the art to which it pertains, or with which it is most nearly connected, to make and use the same.

Figure 1:
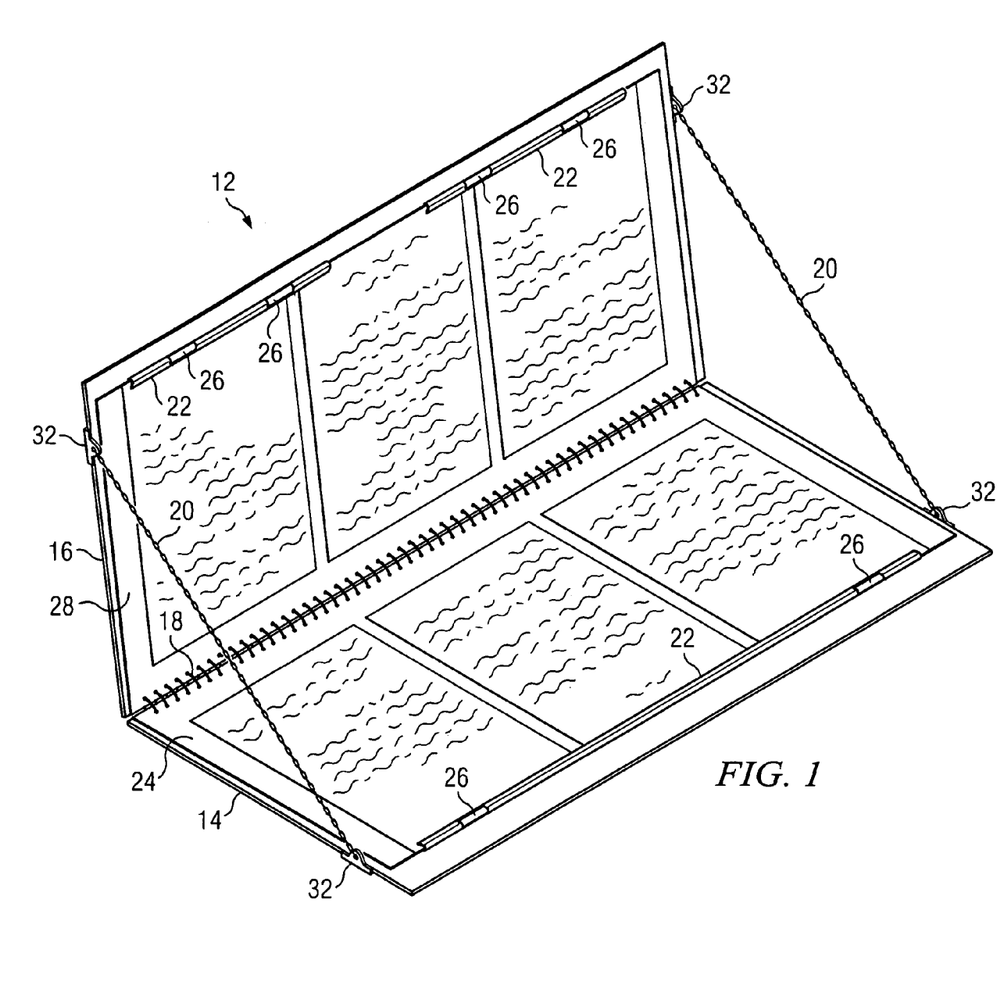
FIG. 1 is a perspective view of a music holder assembly in accordance with a first embodiment of this invention.

FIG. 1 shows a perspective view of a basic version of my music holder 12. A size of the music holder 12 will accommodate three 8½ inch×11 inch sheets of music or pages on each side of a display board-A 24 and on each side of a display board-B 28; however, the music holder 12 can be constructed so as to hold any size, as well as any number of sheets of music on each side of the display board-A 24 and on each side of the display board-B 28. Typically, the dimensions of the music holder 12 will be that which will accommodate either two or three 8½ inch×11 inch removable sheets of music on each side of each display board-A 24 and each display board-B 28.

This basic version of my music holder 12 shows one display board-A 24 and one display board-B 28; however, the music holder 12 can be constructed so as to hold any number, as well as any size of display board-A 24 and display board-B 28. Typically, display board-A 24 and display board-B 28 are constructed of a somewhat pliable material, such as 0.014 inch thick posterboard, plastic, or similar material, though it is foreseeable that other materials could be used.

Display board-A 24 is the same width as display board-B 28, but display board-A 24 is ½ inch shorter in height than display board-B 28. In this preferred embodiment 12, display board-A 24 is approximately 26¼ inches wide and 12 inches high, and display board-B 28 is approximately 26¼ inches wide and 12½ inches high.

Figure 4A:
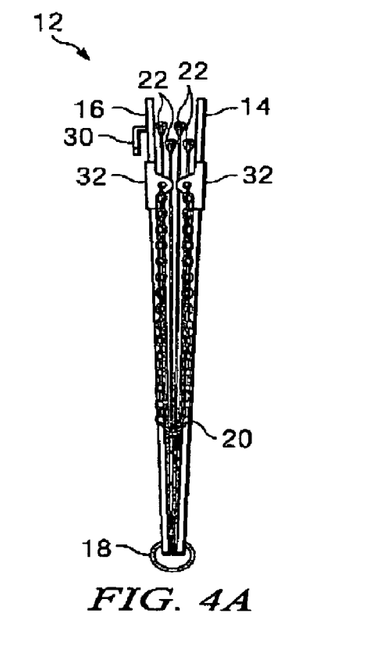
FIG. 4A is a side view of the assembly in its closed position. This figure contains four display boards; however, the music holder may contain any number of display boards.
Figure 4B:
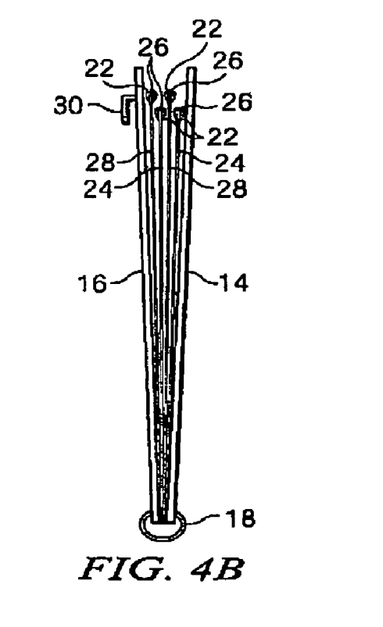
FIG. 4B is a side view of the music holder in its closed position and not including a chain assembly, so the other parts may be seen more clearly. This figure contains four display boards; however, the music holder may contain any number of display boards.

FIGS. 4A and 4B are side views of the music holder in its closed position that illustrate how this difference in height allows paper clamps 22 that are affixed to the upper, horizontal edge of display board-B 28 to avoid abutting the paper clamps 22 that are affixed to the upper, horizontal edge of display board-A 24.

FIG. 4B is a side view of the music holder having the chain assembly not illustrated so as to better show how the display board-A 24 and display board-B 28 are arranged in the music holder 12 in an alternating in sequence, i.e. display board-A 24, then display board-B 28, then display board-A 24, then display board-B 28, etc.

Figure 5A:
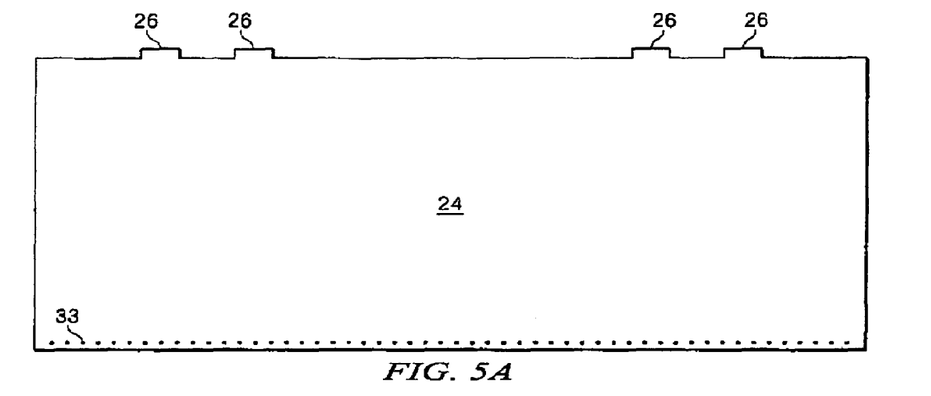
FIG. 5A is a frontal view of a display board.
Figure 5B:
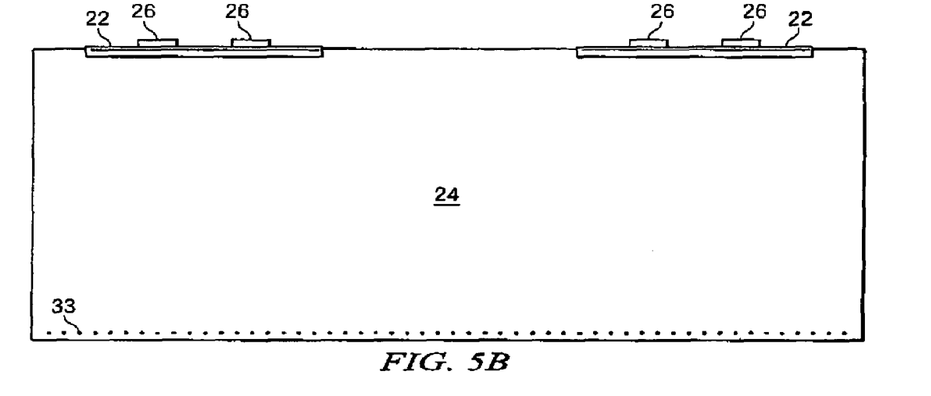
FIG. 5B is a frontal view of a display board with paper clamps mounted on its upper edge. Typically, the display board tabs are folded over the paper clamps and affixed to the paper clamps.

FIGS. 5A and 5B show a frontal view of the display board-A 24. The display board-A 24 and the display board-B 28 are identical in construction, except the display board-A 24 is shorter in height. Therefore, all other features cited in FIGS. 5A and 5B apply to both the display board-A 24 and the display board-B 28.

FIG. 5A shows the top, horizontal edge of the display board-A 24 having four small areas that are slightly raise. These raised areas are actually part of the display board material, itself and are called the display board tabs 26. Typically, each display board tab 26 has the dimensions of approximately ¼ inch×¼ inch. Typically, the display board-A 24 has four display board tabs 26. The number of display board tabs 26 will be determined by the configuration of the paper clamps 22; however, it is foreseeable that other means that do not require the display board tabs 26 could be used to affix the paper clamps 22 to each display board-a 24 and display board-B 28.

Figure 6A:
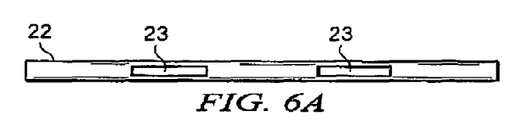
FIG. 6A is a top view of a paper clamp showing the two openings through which the display board tabs protrude.

FIG. 6A shows a top view of the paper clamp 22. There are two paper clamp slots 23 that run lengthwise across the top of each paper clamp 22 and are evenly spaced within the length of the paper clamp 22. Each paper clamp slot 23 is approximately ¼ inch long and is at least as wide as the thickness of the display board material. The paper clamp 22 used in this music binder 12 is a standard, generic report slide that has been modified by creating the paper clamp slots 23; however, any strip of plastic (or similar material) having similar structural features to those of the report slide may be used. The number of paper clamps required for each display board-a 24 and display board-B 28 will depend on the length of the paper clamps 22. One long paper clamp 22 could be used to hold the sheets of music on each display board-a 24 and display board-B 28, or a plurality of shorter paper clamps 22 could achieve the same purpose.

Figure 6B:
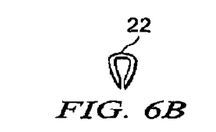
FIG. 6B is a side view of a paper clamp showing a slit at its base that runs the full length of the clamp.

FIG. 6B shows a side view of the paper clamp 22. This view illustrates the configuration of the paper clamp 22 having an opening at its base that runs the entire length of the paper clamp 22.

FIG. 5B is a frontal view that shows the display board-A 24 after the top, horizontal edge of the display board-A 24 has been inserted into the base of paper clamps 22 allowing the paper clamp tabs 26 to protrude upward through the paper clamp slots 23. Typically, each paper clamp 22 is secured from horizontal and vertical movement by the display board tabs 26. This view also shows display board-A holes 33 that are located near the bottom edge of the display board-A 24 and run the length of the bottom edge of the display board-A 24. Typically, the display board-A 24 has approximately 52 display board-A holes 33. These display board-A holes 33 are equally spaced apart with a ½ inch distance separating the center point of each display board-A hole 33 from the next display board-A hole 33. These display board-A holes 33 are positioned so as to have a ¼ inch space between each display board-A hole 33 and the bottom edge of the display board-A 24. The diameter of each display board-A hole 33 is ¼ inch. The number, size, and spacing of the display board-A holes 33 may be of any size and spacing necessary to meet the needs of the user. The immediate area surrounding the display board-A holes 33 may be reinforced with stranded packing tape (or a similar material). These display board-A holes 33 are used to attach the display board-A 24 to the music holder 12.

FIG. 1 shows two paper clamps 22 permanently affixed to the upper, horizontal edge of display board-B 28 and two paper clamps 22 permanently affixed to the upper, horizontal edge of display board-B 24. The paper clamps 22 fit snuggly across the top horizontal edge of the display board-A 24 and lightly clamp against both sides of the display board-A 24 within an area of approximately ¼ inch from the top edge of the display board-A 24. The paper clamps 22 fit snuggly across the top horizontal edge of the display board-B 28 and lightly clamp against both sides of the display board-B 28 within an area of approximately ¼ inch from the top edge of the display board-B 28. The display board tabs 26 are folded over and affixed to the paper clamps 22 using contact cement (or similar adhesive).

FIG. 1 shows a perspective view of a front cover 14 and a back cover 16. The front cover 14 and the back cover 16 must be of suitable rigidity to remain flat while being held in an open position by two light-weight chains 20. The chain used in this music binder 12 is #19 oval chain; however, other types of non-stretching, flexible material can be used to hold the front cover 14 and the back cover 16 in an open position. The front cover 14 and the back cover 16 may be held in an open position by other means, such as hinged braces that open to one or more fixed postitions. In this preferred embodiment 12, the front cover 14 and the back cover 16 are made of hardboard paneling having the dimensions of 27 inches wide, 13 inches high, and ⅛ inch thick; however, the front cover 14 and the back cover 16 can be constructed of any dimensions and thickness to achieve the needs of the user. Other suitably rigid materials for the front cover 14 and the back cover 16 include various structural plastics, though it is foreseeable that other materials could be used. Each end of each chain 20 attaches to a chain anchor 32. Rivets may be used to attach the chain anchors 32 to the front cover 14 and the back cover 16, though it is foreseeable that other means of attachment could be used. One chain anchor 32 is attached to each side of the front cover 14 at the outer vertical edge and near the corner that is away from a wire spiral 18. One chain anchor 32 is attached to each side of the back cover 16 at the outer edge and near the corner that is away from the wire spiral 18.

Figure 7A:
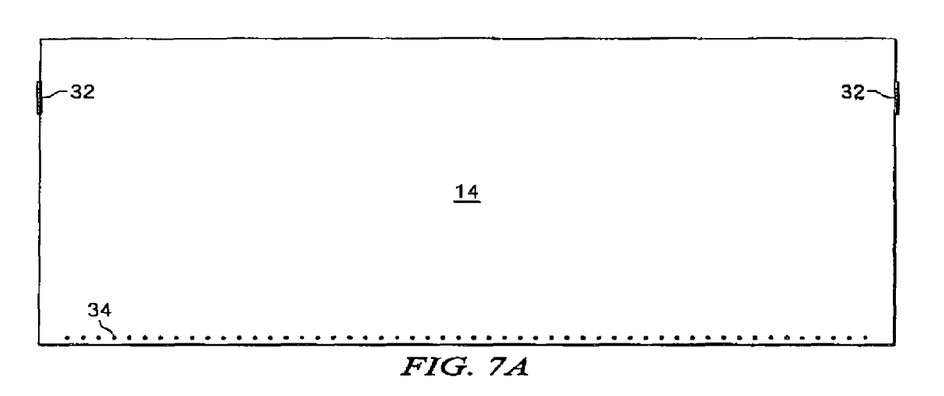
FIG. 7A is a frontal view of a front cover of the music holder.

FIG. 7A is a frontal view of the front cover 14 that shows the approximate locations of the chain anchors 32 on the front cover 14. This view also shows the front cover holes 34 that are located near the bottom edge of the front cover 14 and run the length of the bottom edge of the front cover 14. Typically, the front cover has approximately 52 front cover holes 34. These front cover holes 34 are equally spaced apart with a ½ inch distance separating the center point of each front cover hole 34 from the next front cover hole 34. These front cover holes 34 are positioned so as to have a ¼ inch space between each front cover hole 34 and the bottom edge of the front cover 14. The diameter of each front cover hole 34 is ¼ inch. The number, size, and spacing of the front cover holes 34 may be of any size and spacing necessary to meet the needs of the user. The immediate area surrounding the front cover holes 34 may be reinforced with stranded packing tape (or a similar material). These front cover holes 34 are used to attach the front cover 14 to the music holder 12.

Figure 7B:
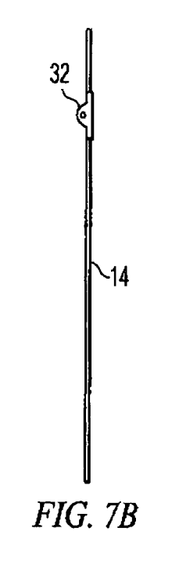
FIG. 7B is a side view of the front cover with a chain anchor attached.

FIG. 7B is a side view of the front cover 14 that illustrates the typical position of the chain anchor 32. Typically, the chain anchor 32 is a small, steel, curtain-rod holder strip that has been modified to accommodate a small chain 20 or strap; however, other means of attaching the chain 20 may be used.

Figure 8:
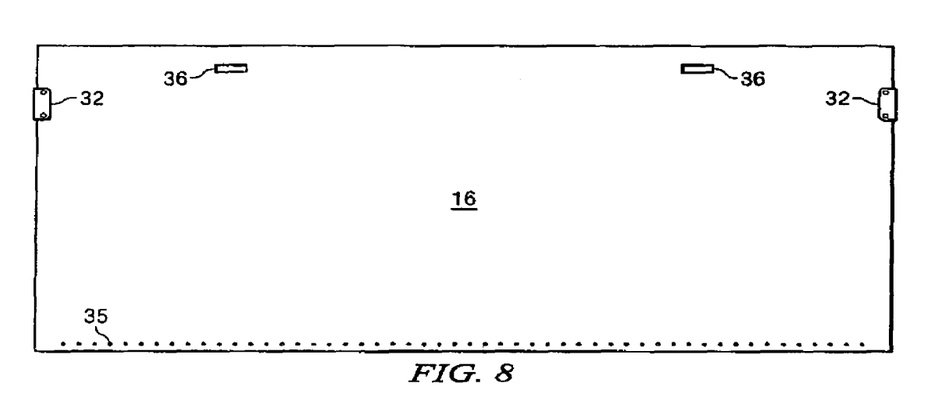
FIG. 8 is a rear view of a back cover of the music holder.

FIG. 8 is a frontal view of the back cover 16 that shows the approximate locations of the chain anchors 32 on the back cover 16. This view also shows the back cover holes 35 that are located near the bottom edge of the back cover 16 and run the length of the bottom edge of the back cover 16. Typically, the back cover 16 has approximately 52 back cover holes 35. These back cover holes 35 are equally spaced apart with a ½ inch distance separating the center point of each back cover hole 35 from the next back cover hole 35. These back cover holes 35 are positioned so as to have a ¼ inch space between each back cover hole 35 and the bottom edge of the back cover 16. The diameter of each back cover hole 35 is ¼ inch. The number, size, and spacing of the back cover holes 35 may be of any size and spacing necessary to meet the needs of the user. The immediate area surrounding the back cover holes 35 may be reinforced with stranded packing tape (or a similar material). These back cover holes 35 are used to attach the back cover 16 to the music holder 12.

Figure 2:
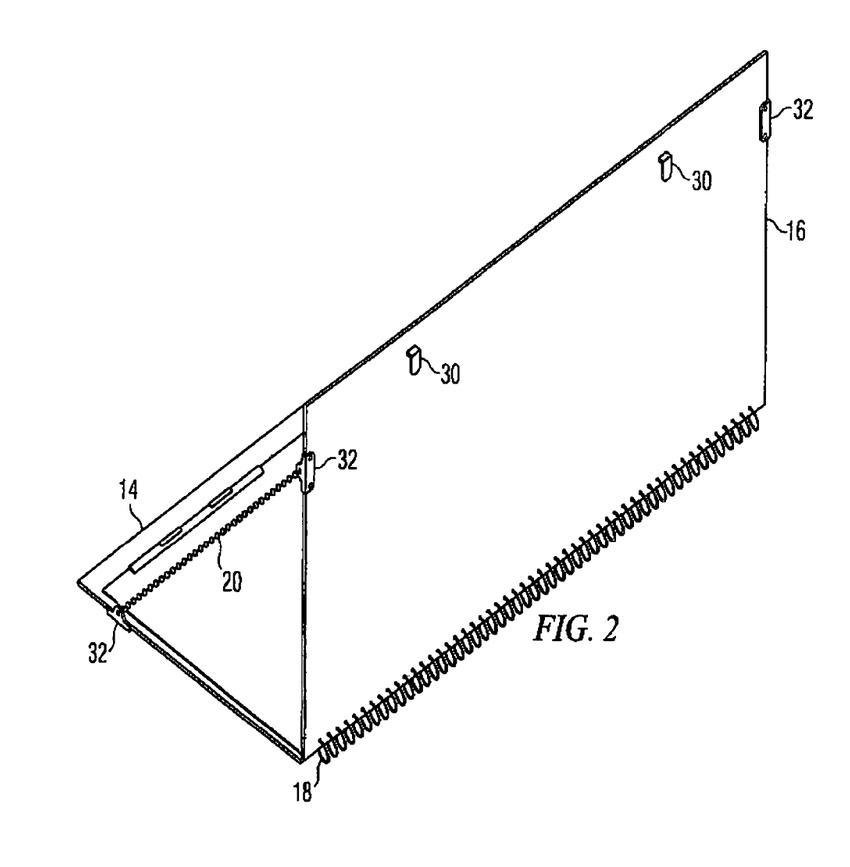
FIG. 2 is a rear view of the perspective view of the music holder assembly in accordance with the first embodiment of this invention.

FIGS. 1 and 2 are perspective views of the music holder 12 that illustrate the location of the wire spiral 18. The wire spiral 18 runs horizontally the width of the music holder 12 near its bottom edge. The front cover 14, the back cover 16, the display board-A 24, and the display board-B 28 are bound together by the wire spiral 18. Suitably rigid materials for the wire spiral 18 include steel, plastic, and aluminum though it is foreseeable that other materials could be used. A 14 gauge steel wire provides suitable rigidity for this purpose; however, there are other gauges that will perform properly.

FIG. 2 shows a perspective view of the basic version of my music holder 12 in the open position as viewed from the rear. This view shows the location of hanging brackets 30. Each hanging bracket 30 is a bent strip of heavy gauge steel that permanently attaches to the back cover 16 and angles downward to provide a simple means by which the music holder 12 can attach to a standard music stand (or similar device). When the music holder 12 is attached to the music stand, the hanging brackets 30 lie on the top horizontal edge of the music stand, allowing the stand's edge to wedge snuggly between the back cover 16 and the hanging brackets 30. Other suitable materials for the hanging brackets 30 include steel, brass, various other forms of metal, various structural plastics, though it is foreseeable that other materials could be used.

In FIG. 2, display board-A 24 and display board-B 28 are in their upper position in the music holder 12 and therefore, are not shown.

Figure 3:
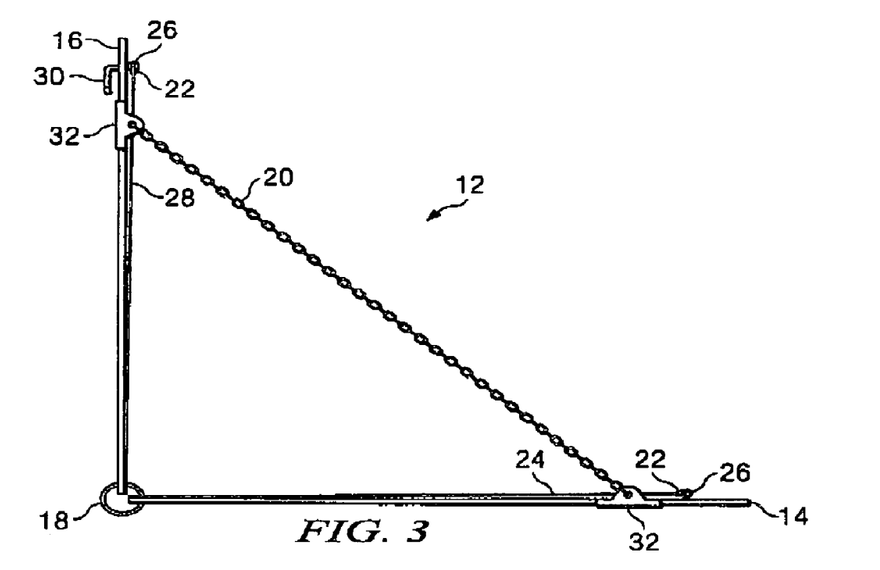
FIG. 3 is a side view of the assembly in its open position. This figure contains only two display boards; however, the music holder would typically contain more than two display boards.

FIG. 3 shows a side view of the basic version of the music holder 12 in the open position.

Operation—FIGS. 1, 3, and 4A

As shown in FIG. 1, the music holder 12 is of great benefit to anyone who must view more than two sheets of music or pages while his or her hands are preoccupied with performing another task.

Typically, the music-score/lyrics pages are initially photocopied from an original music-book or other source, upon one side of a page only. These photocopied sheets of music are attached to a plurality of display boards-A 24 and display boards-B 28 shown in FIGS. 4A and 4B. Originally, this music holder 12 was developed to benefit musicians who play stringed instruments. Because these instruments require the continuous use of both hands, the act of turning sheet music pages back and forth was very cumbersome. The music holder 12 allows the musician to comfortably view more than two sheets of music or pages (typically 4, 6, or more sheets) without having to pause to turn sheets of music. Typically, the sheets of music have the dimensions of 8½ inches×11 inches; however, the dimensions of the sheets can be of any size useful to the user.

As shown in FIGS. 1 and 3, display board-A 24 and display board-B 28 are permanently attached in the music holder 12 in a way that allows the user to easily flip to another set of sheets of music. The most effective method of binding together the front cover 14, the back cover 16, the display board-A 24 and the display board-B 28 is with the spiral-bound style construction so as to allow the music holder 12 to open vertically to any desired angle. This allows the user to view one side of the display board-A 24 and one side of the display board-B 28 simultaneously.

Sheets of music or pages are temporarily attached to the display board-A 24 and the display board-B 28 by sliding the top or bottom edge of each sheet of music between the display board-A 24 or the display board-B 28 and a paper-clamping device 22 that is permanently affixed to the top, horizontal edge of the display board-A 24 and the display board-B 28. This allows the user to easily replace the sheets of music currently in the music holder 12 with different sheets of music. For example, when either the display board-A 24 or the display board-B 28 is in the upper position in the music holder 12, the top right corner of a sheet of music can be placed at the left edge of a paper clamp 22, and the top right corner of the sheet of music can be inserted under the left edge of the paper clamp 22. Then the entire top edge of the sheet of music can be slid horizontally to the right and be securely clamped between the paper clamp 22 and the display board-A 24 or the display board-B 28. This has the effect of pinching and holding the sheets of music to either the display board-A 24 or the display board-B 28, yet the sheets of music can be easily removed and replaced without damaging the sheets, themselves, the display board-A 24, or the display board-B 28.

When either the display board-A 24 or the display board-B 28 is in the lower position in the music holder 12, the bottom right corner of a sheet of music can be placed at the left edge of a paper clamp 22, and the bottom right corner of the sheet of music can be inserted under the left edge of the paper clamp 22. Then the entire bottom edge of the sheet of music can be slid horizontally to the right and be securely clamped between the paper clamp 22 and the display board-A 24 or the display board-B 28. This has the effect of pinching and holding the sheets of music to either the display board-A 24 or the display board-B 28, yet the sheets of music can be easily removed and replaced without damaging the sheets, themselves, the display board-A 24, or the display board-B 28.

After the sheets of music affixed to the display board-B 28 and the display board-A 24 located in the upper and lower positions of the music holder respectively 12 have been read, the upper display board (could be either the display board-B 28 or the display board-A 24) may be flipped (turned) to the lower position, presenting another set of pages in both the upper and lower positions. This procedure may be repeated until all of the display boards have been placed in the lower position.

It is often necessary for the musician to replay music from previous sheets. This music holder 12 provides the musician with a quick and convenient means to access sets of sheets of music on any display boards-B 28 and the display boards-A 24 exposed previously. This access is accomplished by simply lifting the display board or display boards currently in the lower position in the music holder 12 and raising them into the upper position. The slightly reclined angle of the music holder 12 while attached to a stand and the stiffness of the display boards-B 28 and the display boards-A 24 allow the display board currently in the upper position of the music holder 12 to remain in place (not fall).

As shown in FIGS. 2, 3, 4A, and 4B, the music holder 12 is designed to simply hang on most music stands. The music holder 12 is portable, so the musician can easily transport the music holder 12 and attach it to a standard music stand (or similar device) to create a secure, removable coupling of the music holder 12 with the stand. Attachment does not require any modifications be made to most standard music stands. Also, it can attach to other types of stands, such as an easel.

Accordingly, the reader will see that the music holder of this invention enables the user to view more than two sheets of music (or other printed material, perhaps an orator's speech-pages) at a given time. The display boards are permanently attached in the music holder in a way that allows the user to easily turn the display boards vertically in either direction, upward and downward, to quickly access another set of sheets of music. The musician can replace the music in the music holder quickly and easily, because the sheets of music are temporarily attached to each of the display boards by sliding the top or bottom edge of each sheet between the display board and a paper-clamping device that is permanently affixed to a given display board. The music holder conveniently attaches to the top edge of most standard music stands (or similar devices) to create a secure, removable coupling of the music holder with the stand.

I claim:

1. A multi-page viewing binder facilitating viewing of sequential sets of more than two sheets of printed material, one side of all said sheets of a chosen set being displayed simultaneously to the user, said multi-page viewing binder comprising:
    a. a plurality of display boards pivotably attached near an edge thereof,
    b. first means for binding together said display boards near an edge thereof,
    c. second means for temporarily attaching a plurality of said sheets, where said sheets are not attached to first means, to each side of each said display board, and where said second means is a device selected from a group comprised of one long paper clamp, a plurality of shorter paper clamps, and other similar mechanical clamping devices whereby said multi-page viewing binder has a structure that enables the user to view said sequential sets of more than two sheets of printed material, one side of all said sheets of a chosen set being displayed simultaneously to the user.

2. The multi-page viewing binder of claim 1 wherein said first means is a wire spiral.

3. The multi-page viewing binder of claim 1, further including third means for securing said paper clamping device to each said display board, whereby said paper clamping device is secured from horizontal and vertical movement.

4. The multi-page viewing binder of claim 1 further including a front cover and a back cover pivotably attached to said plurality of display boards near an edge thereof using said first means whereby said multi-page viewing binder will enable a user to view said sequential sets of more than two sheets of printed material, one side of all said sheets of a chosen set being displayed simultaneously to the user.

5. The multi-page viewing binder of claim 4 wherein said front cover is pivotably attached to enable opening to any angle to said back cover to create a base that supports said display boards that are in said display boards' lower position.

6. The multi-page viewing binder of claim 5, further including fourth means for holding said front cover in an open position at a desired angle to said back cover.

7. The multi-page viewing binder of claim 6 wherein said fourth means is a device selected from a group comprised of hinged braces, chain, and other suitable types of non-stretching, flexible material.

8. The multi-page viewing binder of claim 4, further including fifth means for said multi-page viewing binder to attach to an external support.

9. The multi-page viewing binder of claim 8 wherein said fifth means comprises a set of hanging brackets whereby said hanging brackets create a secure, removable coupling of said multi-page viewing binder with said external support.

10. A method of viewing the multi-page viewing binder of claim 4, comprising the steps of:
    a. attaching any number of said sheets to each side of each said display board, said number of said sheets predicated upon the predetermined sizes of said sheets and said display board,
    b. placing said front cover into its lower position and setting the angle of said front cover to said back cover whereby enabling a user to view both one side of said display board in its upper position and one side of another said display board in its lower position,
    c. moving said display board that is in its upper position into its lower position whereby enabling a user to view another said set of more than two sheets of printed material, one side of all said sheets of said set being displayed simultaneously to the user,
    d. moving said display board that is in its lower position back into its upper position whereby exposing a previously viewed said set of more than two sheets of printed material, one side of all said sheets of said set being displayed simultaneously to the user,
whereby enabling the user to view said sequential sets of more than two sheets of printed material, one side of all said sheets of a chosen set being displayed simultaneously to the user.

11. The method of claim 10 wherein attaching said sheets to said display board is accomplished by sliding an edge of each said sheet between said display board and said paper clamping device, said paper clamping device being affixed to the top, horizontal edge of said display board as viewed with said display board in its upper position.

12. The method of claim 10, further including attaching said multi-page viewing binder to said external support whereby said multi-page viewing binder is held in position.

13. The method of claim 12 wherein attaching said multi-page viewing binder to said external support is accomplished by said hanging brackets permanently mounted to said back cover, said hanging brackets fitting intimately onto a horizontal edge of said external support to create a secure, removable coupling of said multi-page viewing binder with said external support.

14. The method of claim 12 wherein said external support is selected from a group comprised of music stands, easels, and other types of stands.

* * * * *